United States Patent [19]

Märzhäuser

[11] Patent Number: 4,700,585
[45] Date of Patent: Oct. 20, 1987

[54] DRIVE FOR THE COMPOUND STAGE OF A MICROSCOPE OR SIMILAR APPARATUS

[75] Inventor: Heinz Märzhäuser, Wetzlar, Fed. Rep. of Germany

[73] Assignee: Gebr. Märzhäuser Wetzlar oHG, Wetzlar, Fed. Rep. of Germany

[21] Appl. No.: 846,820

[22] Filed: Apr. 1, 1986

[30] Foreign Application Priority Data

Aug. 9, 1985 [DE] Fed. Rep. of Germany ....... 3528615

[51] Int. Cl.[4] ..................... G02B 21/26; G05G 11/00
[52] U.S. Cl. ........................ 74/479; 74/531; 188/75; 350/531
[58] Field of Search ................ 74/479, 531; 188/75; 350/531; 108/143

[56] References Cited

U.S. PATENT DOCUMENTS

| | | | |
|---|---|---|---|
| 4,189,953 | 2/1980 | Volk | 350/531 |
| 4,262,991 | 4/1981 | Wagener et al. | 350/531 |
| 4,402,576 | 9/1983 | Stahl et al. | 350/531 |
| 4,552,033 | 11/1985 | Marzhauser | 74/479 |
| 4,615,592 | 10/1986 | Schob et al. | 74/479 |

Primary Examiner—Allan D. Herrmann
Attorney, Agent, or Firm—Quaintance, Murphy & Presta

[57] ABSTRACT

A drive system for slides and x-y stages in microscopes and similar instruments having the possibilities of both fine control and rapid displacement of the slides over larger distances. The drive system comprises a friction wheel and a friction track provided between the slide and the stationary slide guide. A friction wheel together with an actuation knob are solidly fixed on a common shaft and this common shaft is displaceable against a spring force so that the friction wheel is out of contact with the friction track. A brake shoe is provided for each shaft and a clamping element is provided for each brake shoe. The shafts are supported in ball bearings. The brake shoes are closed plastic rings and the clamping elements press uniformly by their U-legs and from diametrically opposite sides against the plastic rings in the braking position, the direction of the force passing through the center axis of the coaxial shafts. Accordingly, the braking forces are applied uniformly from two sides and balance each other, whereby no force component arises which would laterally shift the coaxial shafts.

6 Claims, 4 Drawing Figures

DRIVE FOR THE COMPOUND STAGE OF A MICROSCOPE OR SIMILAR APPARATUS

CROSS-REFERENCE TO A RELATED APPLICATION

Applicant claims priority under 35 USC 119 for application P 35 28 615.6, filed Aug. 9, 1985, in West Germany.

BACKGROUND OF THE INVENTION

The field of the invention is machine elements and mechanisms, particularly control lever and linkage systems having multiple controlling elements.

The present invention is particularly concerned with a drive for the compound stage of a microscope, or a similar apparatus displaceable along two coordinates in rectilinear guides, with a release device for the drive to rapidly adjust the carriage.

Applicant incorporates herein the disclosure of his U.S. Pat. No. 4,552,033 which shows the state of the art of drive systems for microscope stages or the like.

The present invention begins with a state of art such as is disclosed by U.S. Pat. No. 4,552,033. This patent discloses a position control in which the drive connections between the actuating knobs and the stage consist of a frictional linkage with friction wheel and friction track. In order to allow rapid displacement of the stage, the friction wheels are lifted off their associated friction tracks by pins acting on them in the axial direction of the drive shafts, whereby the stage is freely displaceable.

However, this type of stage displacement incurs the drawback that the force exerted by the pins in the axial direction of the shafts may slightly affect the set height of the stage, i.e., to change this height. As a result, the focus of the object underneath the microscope objective is lost. Frequently, refocusing is then required.

West German patent application No. P 35 05 217 filed Feb. 15, 1985 and not yet part of the state of the art discloses a position control for a compound slide displaceable in two straight guides along two coordinates for a microscope or similar apparatus. The apparatus has one drive link between the first slide and the stationary stage part and one drive link between the first and the second slides, the position-control consisting of two shafts supported in coaxial manner, with one actuation knob mounted at each end of each shaft, and the drive link consisting of two pinions, each fixed to one of the two shafts and meshing with a gear rack at the stationary stage part and at the second slide respectively.

One brake shoe each is provided for each shaft and is movable into an OPEN and into a BRAKED position, where each shoe in the OPEN position releases its associated shaft so as to allow easy shaft rotation and where in the BRAKED position the shoe brakes this shaft into a rotation against resistance. One clamping element each is provided for each brake shoe and this clamping element is transferable by an actuation means resting on the first slide into a position respectively closing and opening the brake shoes.

The shafts are supported by ball bearings assuring especially easy rotation of the shafts in the OPEN position.

The brake shoes are inherently elastic springs cut open at one location of their circumference, each one being slipped over a shaft and the clamping elements assuming a U-shape and being displaceable approximately perpendicularly to the shafts and thereby compressing or releasing the slitted rings by their U-shaped legs.

Application P 35 05 217 contains braking jaws in the form of slit rings being compressed by clamping elements displaceable in the direction of the axis of the coaxial shafts. The U-shaped legs of the clamping elements rest almost laterally against the rings outside the plane of the center axis of the coaxial shafts. One component of force is obtained in this clamping process at each clamping site, and all these components cooperatively act in the direction of the displacement of the clamping elements on the shafts, whereby these shafts are forced to the rear. While the lateral offset of the coaxial shafts is minimal, it is nevertheless noticeable at large microscope amplifications as a displacement of the object in the image field of the objective.

SUMMARY OF THE INVENTION

According to the present invention care is taken that the components of force laterally acting on the shafts are no longer effective. This is achieved in that the U-legs of the clamping elements rest laterally against the braking jaws in the plane of the center axis of the shafts, whereby the force applied in clamping passes through the center axis. As, furthermore, two U-legs act on each braking jaw, namely one on each side, the compressive forces mutually cancel so that the coaxial shafts are, furthermore, no longer forced to the rear.

This is achieved by the features of the present invention in that the braking jaws are closed plastic rings and in that the clamping elements are U-shaped components resting by each of their U-legs against one each of the braking jaw at the same side and at the level of the center axis of the coaxial shafts. Both clamping elements are pivotable simultaneously about an axis parallel to each other and to the center axis of the coaxial shafts so that in the braking position they brake the motion of the coaxial shafts while deforming the plastic rings and so that in the open position they release the shafts so these may rotate easily.

In the present application, therefore, the clamping elements are no longer displaced by the actuation device but, instead, and as already stated, the actuation device pivots or tips them. For that purpose the clamping elements are provided at their inside, i.e., at the side facing the actuation device in the form of a toggle lever, with a projection, cam or the like, whereby these clamping elements are spread apart by these cams and, accordingly, are compressed on the other side when the toggle lever is pressed into the braking position.

The U-legs of the clamping elements furthermore may also be provided with cams, beads or the like, which, for the braking position, then in turn press against plastic rings.

Moreover, a spring is mountable between the clamping elements for the purpose of biasing the clamping elements toward the open position. However, such a spring is not essential for operation.

BRIEF DESCRIPTION OF THE DRAWINGS

The drawings show an illustrative embodiment of the present invention in further detail, wherein.

DESCRIPTION OF THE PREFERRED EMBODIMENTS

Figure 2:
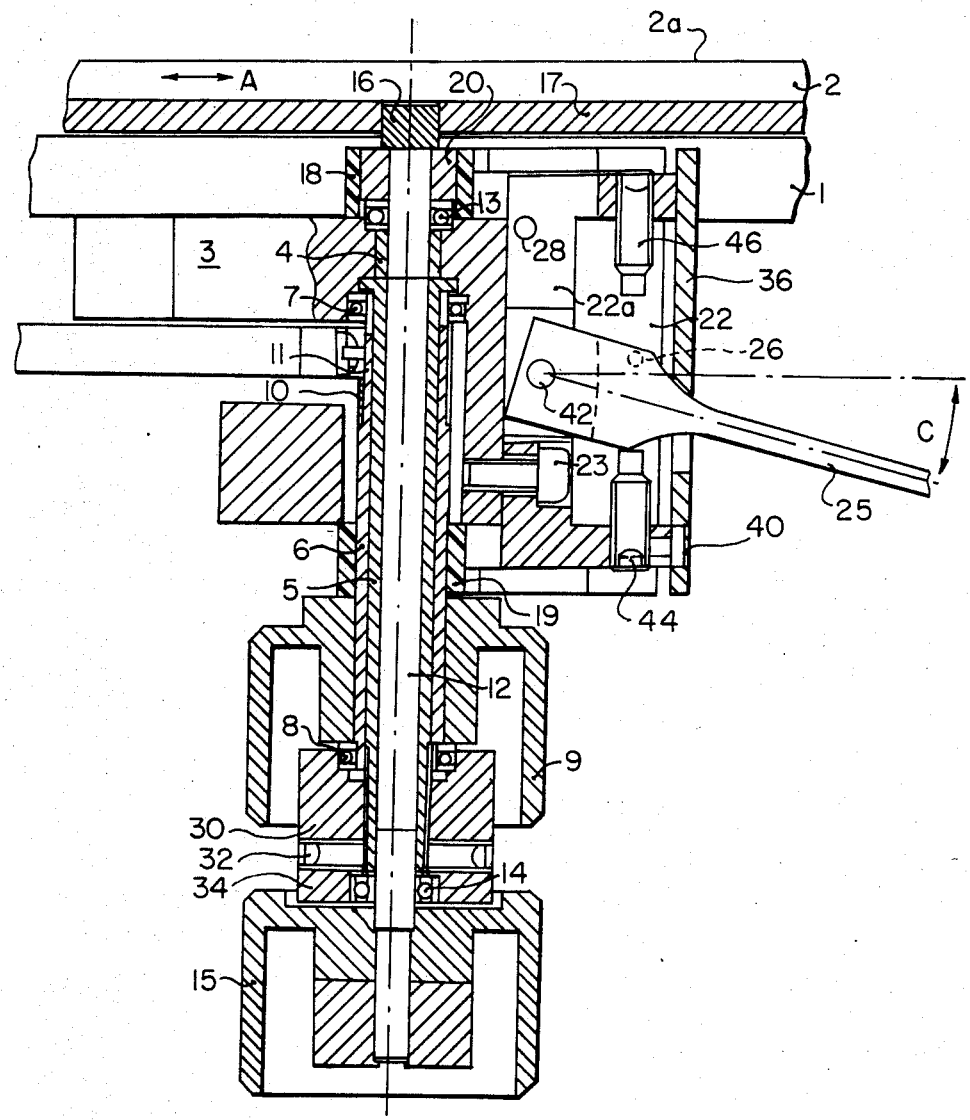
FIG. 2 is a side view section through the drive at the level of the center axis of the coaxial shafts.
Figure 4:
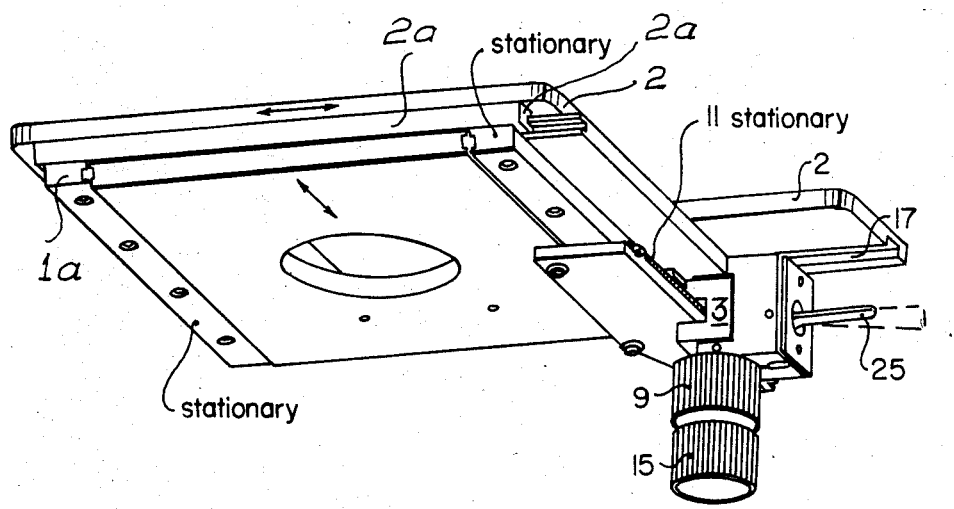
FIG. 4 is a perspective schematic showing of the x-y stage of the present invention.

FIGS. 2 and 4 show two mutually orthogonally displaceable carriages 1 and 2 of a compound microscope stage, the surface 2a of the carriage 2 being the stage resting surface. This carriage is displaceable in the plane of the drawing of FIG. 2 in the direction of the double arrow A by rectilinear guide 2a.

Carriage 1 supports carriage 2 in rectilinear guides 1a and, in turn, is displaceable perpendicularly to the plane of the drawing. Carriage 1 is provided at its lower part with a block 3 into which a hollow shaft 5 is firmly screwed at 4. This hollow shaft 5 supports at its outer periphery a second hollow shaft 6 rotatably supported in ball bearings at 7 and 8 and solidly joined at its bottom to an actuation knob 9 and at its top being designed to be a pinion 10. The hollow shaft 6 meshes by this pinion 10 with a gear rack 11 which is fixed in place, for instance being rigidly mounted to the microscope stand.

When the actuator knob 9 is rotated, the pinion 10 rolls on the gear rack 11 and thereby both carriages 2 and 1 move jointly perpendicularly to the plane of the FIG. 2.

A solid shaft 12 is located within the first hollow shaft 5 and rests in ball bearings at 13 and 14, terminating at its bottom in an actuation knob 15 and at its top bearing a pinion 16. A gear rack 17 fixed to the carriage 2 meshes with the pinion 16. When, thereby, the actuation knob 15 is rotated, the pinion 16 displaces the gear rack 17 and thereby displaces solely the carriage 2 in the direction of the arrow A.

The solid shaft 12 and the second hollow shaft 6 each are enclosed by compressible plastic rings 18 and 19. The plastic ring 18 is placed on a spacer ring 20.

Figure 1:
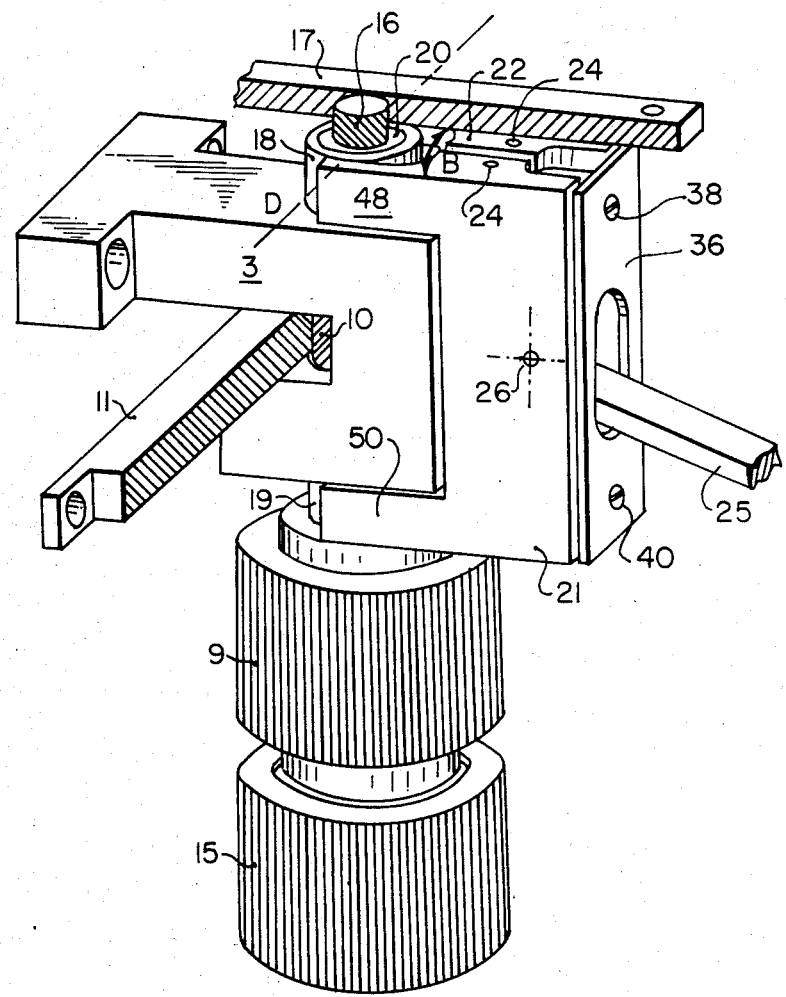
FIG. 1 is a schematic perspective of a drive system for the present invention.

Two clamping elements 21 and 22 cooperate with these plastic rings and are U-shaped and provided with corresponding U-legs. FIG. 1 clearly shows the clamping element 21 and further it shows that its two U-legs resting at the top against plastic ring 18 and at the bottom against the plastic ring 19. The second clamping element 22 is shaped exactly like the first one and rests by its U-legs against the plastic rings from the rear.

It is of determinant importance that the rest points of the U-legs be located on the same diametral line D and that this line pass through the center axis of the coaxial shafts (FIG. 1).

The two clamping elements 21 and 22 are mounted in the manner shown in FIG. 1 and are borne on a U-shaped support 22a fixed by screws 23 into the block 3 (FIG. 2). The clamping elements 21, 22 are held by pins 24 in the support 22a and are tippable about these pins in the direction of the arrow B shown in FIG. 1.

Figure 3:
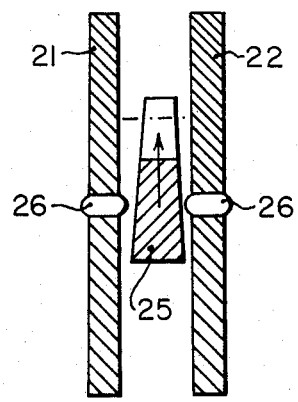
FIG. 3 is a schematic section of the actuation device.

This tipping is implemented by an actuation device 25 in the form of a lever which is pivotable in the block 3 in the direction of the arrow C about pin 42 in the manner shown in FIG. 2. FIG. 3 schematically shows the effect of this pivoting motion. It is clear from FIG. 3 that the toggle lever widens its cross-section toward the bottom and that this cross-section cooperates with two set screws 26 inserted in the clamping elements.

Face plates 36 is secured by screws 38, 40 and lever 25.

These components operate as follows: In the open position illustratively shown in FIG. 2, the actuation device 25 is in the shown lower position where it does not act on the set screws 26. Therefore, the U-legs of the clamping elements rest only loosely against the braking jaw. If desired, the clamping elements are spread apart by a compression spring indicated at 28 whereby the braking jaws are entirely free. In that position the carriages 1 and 2 are easily displaced by hand in any direction due to the ball bearings supporting the coaxial shafts 6 and 12. The range of movement of lever 25 is controlled by pins 44, 46.

When, however, the actuation device 25 is tipped upward, then its widening cross-section impacts the set screws 26 which thereby are forced apart, the clamping elements 21, 22 being pivoted about their axes defined by the pins 24. The U-shaped legs of the clamping elements in this process move toward one another and press both at the top 48 and at the bottom 50 from the front and from the rear (FIG. 1) against the plastic rings 18 and 19, i.e., they compress the plastic rings with slight deformation. This brakes the coaxial shafts 6 and 12. The carriages are no longer easily displaced by hand nor can they easily shift on their own. Nevertheless they can be quickly moved by means of the actuation knobs 9 and 15. Between knobs 9 and 15 are located upper sleeve 30, spacer 32 and lower sleeve 34.

As already explained, this embodiment offers the determinant advantage that the force of the U-legs of the clamping elements passes through the plane of the center axis of the coaxial shafts and that the clamping forces are orthogonal to each other. Accordingly, there is no force component left which might laterally displace the coaxial shafts.

What is claim is:

1. In a drive system for an x-y stage of a microscope or similar instrument having a first displaceable slide and a second slide displaceable at an angle to said first slide, first stationary slide guide means for said first displaceable slide and a second stationary slide guide means for said second slide comprising:
    (a) a rack and pinion connection having first and second pinions and first and second racks arranged respectively between said first slide and said first stationary slide guide means on the one hand and between said first slide and said second slide;
    (b) said first pinion having a first actuation knob and a first common solid shaft;
    (c) said second pinion having a second actuation knob and a second common hollow shaft coaxial to said first shaft;
    (d) a braking jaw for each shaft and movable into an open and into a braking position, which in the open position releases its associated shaft so it may rotate easily and which in its braked position brakes this shaft to render rotation difficult, and comprising one clamping element for each, braking jaw, where said element is movable by an actuation device resting on said first slide into a position closing or opening the braking jaw; and
    (e) where the shafts rest in ball bearings to assure easy rotation of the shafts for the open position,
    the improvement comprising:
    said braking jaws (18, 19) comprising closed plastic rings and said clamping elements (21, 22) comprising U-shaped components each resting with one of their U-legs against the same side of each of the braking jaws (18, 19) at the level of a central axis of said coaxial shafts (6, 12), both clamping elements being pivotable simultaneously by said actuation devices (25) about axes parallel to each other and to the central axis of the coaxial shafts (6, 12) so that for the braking position they brake the motion of the coaxial shafts (6, 12) while deforming the braking jaws (18, 19) and for the open position they release the shafts so they may be easily rotated.

2. The drive system of claim 1, wherein said actuation device (25) is a toggle-lever supported by the first carriage (1) so as to be vertically movable and in that the clamping elements (21, 22) are provided on their sides facing the toggle lever each with a projection (26) against which is forced said toggle lever (25) in the braking position.

3. The drive system of claim 2, wherein said projection is a cam.

4. The drive system of claim 1, wherein said clamping elements (21, 22) are provided at their sides of their U-legs facing the braking jaws (18, 19) each with a set screw by means of which they press against the plastic rings in the braking position.

5. The drive system of claim 4, wherein said bead is a cam.

6. The drive system of claim 1, wherein a spring (28) is provided between the two U-shaped clamping elements (18, 19) to bias the clamping elements toward their open position.

* * * * *